United States Patent
Uchiyama et al.

(10) Patent No.: US 9,454,824 B2
(45) Date of Patent: Sep. 27, 2016

(54) PATTERN PROCESSING DEVICE, PATTERN PROCESSING METHOD, AND PATTERN PROCESSING PROGRAM

(71) Applicants: Yukinaka Uchiyama, Tokyo (JP); Fumihiro Hasegawa, Tokyo (JP)

(72) Inventors: Yukinaka Uchiyama, Tokyo (JP); Fumihiro Hasegawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/691,747

(22) Filed: Apr. 21, 2015

(65) Prior Publication Data

US 2015/0228083 A1    Aug. 13, 2015

Related U.S. Application Data (63) Continuation of application No. 13/896,912, filed on May 17, 2013, now Pat. No. 9,123,123.

(30) Foreign Application Priority Data

May 22, 2012  (JP) ................................. 2012-116992
Mar. 5, 2013  (JP) ................................. 2013-043522
Mar. 15, 2013  (JP) ................................. 2013-054193

(51) Int. Cl.
*G06K 9/48*    (2006.01)
*G06T 7/00*    (2006.01)
(Continued)

(52) U.S. Cl.
CPC ........... *G06T 7/0085* (2013.01); *G06K 9/4638* (2013.01); *G06T 5/006* (2013.01); *G06T 7/0083* (2013.01); *G06T 2207/20144* (2013.01)

(58) Field of Classification Search
None
See application file for complete search history.

(56) References Cited

U.S. PATENT DOCUMENTS 4,995,716 A * 2/1991 Warnicki ............... A61B 3/107
                                                      351/212
6,259,809 B1 * 7/2001 Maruo ................. G06K 9/4633
                                                      382/147

(Continued)

FOREIGN PATENT DOCUMENTS

CN    101256157 A    9/2008
CN    101814139 A    8/2010
(Continued)

OTHER PUBLICATIONS

Chinese official action dated Sep. 16, 2015 in corresponding.
(Continued)

*Primary Examiner* — Chan Park
*Assistant Examiner* — Iman K Kholdebarin
(74) *Attorney, Agent, or Firm* — Cooper & Dunham LLP (57) ABSTRACT

A pattern processing device includes: an input unit to input an input image containing a plurality of pattern elements; an extraction unit that calculates edge intensities of pixels from the input image so as to extract edge pixels; an evaluation unit that obtains evaluation values for determining whether the pixels are foreground pixels or background pixels, based on comparison result between first thresholds set corresponding to the edge pixels and pixel values of pixels contained in vicinity regions of the edge pixels; a binarization determining unit that determines whether the pixels are the foreground pixels or the background pixels by comparing the evaluation values with a predetermined second threshold, and a coupling component extraction unit that extracts pixel coupling components obtained by coupling the pixels adjacent in any direction among the pixels determined to be the foreground pixels.

7 Claims, 10 Drawing Sheets

| BRIGHTNESS GRADIENT DIRECTION | DIRECTION CODE | |
|---|---|---|
| $\theta(x, y) \geq 67.5°$ OR $\theta(x, y) \leq -67.5°$ | D(x, y)=1 | ↓ PERPENDICULAR |
| $22.5° < \theta(x, y) < 67.5°$ | D(x, y)=2 | ↘ DIAGONALLY RIGHT DOWN |
| $-22.5° \leq \theta(x, y) \leq 22.5°$ | D(x, y)=3 | → HORIZONTAL |
| $-67.5° < \theta(x, y) < -22.5°$ | D(x, y)=4 | ↗ DIAGONALLY RIGHT UP |

(51) Int. Cl.
*G06T 5/00* (2006.01)
*G06K 9/46* (2006.01)

(56) References Cited

U.S. PATENT DOCUMENTS

| | | | | |
|---|---|---|---|---|
| 8,106,968 B1* | 1/2012 | Rudin | ..................... | G06T 5/006 348/241 |
| 8,411,986 B2* | 4/2013 | Ip | ............................ | G06K 9/38 382/173 |
| 8,467,089 B2* | 6/2013 | Loce | ..................... | G06K 15/02 358/1.9 |
| 8,755,640 B2* | 6/2014 | Saito | ..................... | G06T 3/4015 382/300 |
| 9,123,123 B2* | 9/2015 | Uchiyama | ............. | G06T 7/0085 |
| 2006/0170979 A1* | 8/2006 | Hasegawa | ................. | G06T 5/20 358/3.27 |
| 2006/0171595 A1* | 8/2006 | Hasegawa | ................ | G06K 9/48 382/224 |
| 2009/0316049 A1* | 12/2009 | Fuji | ....................... | H04N 5/142 348/625 |
| 2010/0014778 A1 | 1/2010 | Imai | | |
| 2010/0316288 A1* | 12/2010 | Ip | ............................ | G06K 9/38 382/164 |
| 2010/0329566 A1* | 12/2010 | Nikula | ................... | H04N 5/335 382/190 |
| 2012/0212627 A1* | 8/2012 | Klose | ................... | H04N 9/3182 348/189 |
| 2013/0057707 A1* | 3/2013 | Hasegawa | ............ | H04N 9/3194 348/189 |
| 2014/0267427 A1* | 9/2014 | Hasegawa | ............... | G06T 5/006 345/647 |
| 2014/0313423 A1* | 10/2014 | Johnson | ................. | G03B 21/13 348/745 |

FOREIGN PATENT DOCUMENTS

| | | |
|---|---|---|
| CN | 102136068 A | 7/2011 |
| JP | 2002-232674 | 8/2002 |
| JP | 2002232674 A * | 8/2002 |
| JP | 2010028411 | 2/2010 |
| WO | WO2011/051281 A1 | 5/2011 |
| WO | WO2011/051282 A1 | 5/2011 |

OTHER PUBLICATIONS

Chinese Patent Application No. 201310313418.3.
Feb. 2, 2015 Chinese official action (and English-language translation thereof) in corresponding Chinese patent application No. 201310313418.3.

* cited by examiner

FIG.1A

ORIGINAL CALIBRATION
PATTERN

FIG.1B

PROJECTED CALIBRATION
PATTERN

| BRIGHTNESS GRADIENT DIRECTION | DIRECTION CODE | | |
|---|---|---|---|
| $\theta(x, y) \geq 67.5°$ OR $\theta(x, y) \leq -67.5°$ | D(x, y)=1 | ↓ | PERPENDICULAR |
| $22.5° < \theta(x, y) < 67.5°$ | D(x, y)=2 | ↘ | DIAGONALLY RIGHT DOWN |
| $-22.5° \leq \theta(x, y) \leq 22.5°$ | D(x, y)=3 | → | HORIZONTAL |
| $-67.5° < \theta(x, y) < -22.5°$ | D(x, y)=4 | ↗ | DIAGONALLY RIGHT UP |

| DIRECTION CODE | NON-MAXIMUM SUPPRESSION THRESHOLD |
|---|---|
| $D(x, y)=1$ | $T2(x, y)=Max\{E(x, y+1), E(x, y-1)\}$ |
| $D(x, y)=2$ | $T2(x, y)=Max\{E(x+1, y+1), E(x-1, y-1)\}$ |
| $D(x, y)=3$ | $T2(x, y)=Max\{E(x+1, y), E(x-1, y)\}$ |
| $D(x, y)=4$ | $T2(x, y)=Max\{E(x-1, y+1), E(x+1, y-1)\}$ |

*Max{A, B} INDICATES A LARGER VALUE OF A AND B

FIG.8

| 0 | 0 | 0 | 0 | 0 | 0 | 0 | 0 |
|---|---|---|---|---|---|---|---|
| 0 | 0 | 0 | 1 | 1 | 0 | 0 | 0 |
| 0 | 0 | 4 | 0 | 0 | 2 | 0 | 0 |
| 0 | 3 | 0 | 0 | 0 | 0 | 3 | 0 |
| 0 | 3 | 0 | 0 | 0 | 0 | 3 | 0 |
| 0 | 0 | 2 | 0 | 0 | 4 | 0 | 0 |
| 0 | 0 | 0 | 1 | 1 | 0 | 0 | 0 |
| 0 | 0 | 0 | 0 | 0 | 0 | 0 | 0 |

FIG.9

| DIRECTION CODE | FIGURE-GROUND SEPARATION THRESHOLD | |
|---|---|---|
| $D(x, y)=1$ | $Q(x, y)=\{P(x, y-1)+P(x, y+1)\}/2$ | INTERMEDIATE BRIGHTNESS OF PIXELS ADJACENT IN UPPER AND LOWER DIRECTIONS |
| $D(x, y)=2$ | $Q(x, y)=\{P(x-1, y-1)+P(x+1, y+1)\}/2$ | INTERMEDIATE BRIGHTNESS OF PIXELS ADJACENT IN UPPER LEFT AND LOWER RIGHT DIRECTIONS |
| $D(x, y)=3$ | $Q(x, y)=\{P(x-1, y)+P(x+1, y)\}/2$ | INTERMEDIATE BRIGHTNESS OF PIXELS ADJACENT IN RIGHT AND LEFT DIRECTIONS |
| $D(x, y)=4$ | $Q(x, y)=\{P(x+1, y-1)+P(x-1, y+1)\}/2$ | INTERMEDIATE BRIGHTNESS OF PIXELS ADJACENT IN LOWER LEFT AND UPPER RIGHT DIRECTIONS |

FIG.11

| 0 | 0 | 0 | 1 | 0 | 0 | 0 | 0 |
|---|---|---|---|---|---|---|---|
| 0 | 0 | 1 | 6 | 7 | 0 | 0 | 0 |
| 0 | 0 | 7 | 8 | 7 | 7 | 0 | 0 |
| 0 | 7 | 8 | 11 | 11 | 9 | 8 | 2 |
| 0 | 7 | 9 | 10 | 12 | 9 | 7 | 1 |
| 0 | 0 | 7 | 9 | 10 | 8 | 1 | 0 |
| 0 | 0 | 0 | 8 | 8 | 1 | 0 | 0 |
| 0 | 0 | 0 | 0 | 0 | 0 | 0 | 0 |

FIGURE-GROUND
EVALUATION VALUE C(x, y)

FIG.12

| 0 | 0 | 0 | 0 | 0 | 0 | 0 | 0 |
|---|---|---|---|---|---|---|---|
| 0 | 0 | 0 | 1 | 1 | 0 | 0 | 0 |
| 0 | 0 | 1 | 1 | 1 | 1 | 0 | 0 |
| 0 | 1 | 1 | 1 | 1 | 1 | 1 | 0 |
| 0 | 1 | 1 | 1 | 1 | 1 | 1 | 0 |
| 0 | 0 | 1 | 1 | 1 | 1 | 0 | 0 |
| 0 | 0 | 0 | 1 | 1 | 0 | 0 | 0 |
| 0 | 0 | 0 | 0 | 0 | 0 | 0 | 0 |

BINARIZED IMAGE B(x, y)
*IF C(x, y)≥4 IS SATISFIED,
B(x, y)=1 IS SATISFIED

TOO SMALL

FIG.14B

TOO LARGE

FIG.14C

TOO LONG HORIZONTALLY
AND VERTICALLY

PATTERN PROCESSING DEVICE, PATTERN PROCESSING METHOD, AND PATTERN PROCESSING PROGRAM

CROSS-REFERENCE TO RELATED APPLICATIONS

The present application is a Rule 1.53(b) continuation of application Ser. No. 13/896,912, filed May 17, 2013 which claims priority to and incorporates by reference the entire contents of Japanese Patent Application No. 2012-116992 filed in Japan on May 22, 2012, Japanese Patent Application No. 2013-043522 filed in Japan on Mar. 5, 2013 and Japanese Patent Application No. 2013-054193 filed in Japan on Mar. 15, 2013.

BACKGROUND OF THE INVENTION

1. Field of the Invention

The present invention relates to a pattern processing device, a pattern processing method, and a pattern processing program.

2. Description of the Related Art

An image to be projected onto a screen from a projector usually has trapezoidal distortion due to relative positional relation between the projector and the screen. Non-linear distortion due to local irregularities and torsion of the screen onto which the image is to be projected is observed in some cases.

Japanese Patent Application Laid-open No. 2010-028411 discloses the following technique in order to correct the above-mentioned distortion. That is, disclosed is a technique of image-capturing a screen onto which a calibration pattern image formed by a specific figure array has been projected with a digital camera or the like, calculating the degree of distortion from deviation between an ideal position and an actual extracted position of a characteristic point that is extracted on the captured image based on the figure array, and projecting an image corrected so as to eliminate the calculated distortion from a projector.

It is desirable that operations relating to the projection and image capturing of the calibration image be performed with time and effort as less as possible. In spite of this, in Japanese Patent Application Laid-open No. 2010-028411, since the captured image is binarized by a uniform fixed threshold, an appropriate binarization result cannot be obtained if there is local illumination unevenness resulting from states of an indoor illumination and a screen surface. Because of this, the characteristic point fails to be extracted in some cases. If the indoor illumination is turned off during the calibration operation only or image capturing is repeated until the characteristic point is extracted successfully, time and effort are required.

In view of the above, there is a need to provide a pattern processing device that makes it possible to calibrate distortion with a small effort and extract characteristic points with high accuracy even if there is unevenness at the time of projection.

SUMMARY OF THE INVENTION

It is an object of the present invention to at least partially solve the problems in the conventional technology.

A pattern processing device includes: an input unit to input an input image containing a plurality of pattern elements; an extraction unit that calculates edge intensities of pixels from the input image so as to extract edge pixels; an evaluation unit that obtains evaluation values for determining whether the pixels are foreground pixels or background pixels, based on comparison result between first thresholds set corresponding to the edge pixels and pixel values of pixels contained in vicinity regions of the edge pixels; a binarization determining unit that determines whether the pixels are the foreground pixels or the background pixels by comparing the evaluation values with a predetermined second threshold; and a coupling component extraction unit that extracts pixel coupling components obtained by coupling the pixels adjacent in any direction among the pixels determined to be the foreground pixels.

A pattern processing method includes: inputting an input image containing a plurality of pattern elements; calculating edge intensities of pixels from the input image so as to extract edge pixels; obtaining evaluation values for determining whether the pixels are foreground pixels or background pixels, based on comparison result between first thresholds set corresponding to the edge pixels and pixel values of pixels contained in vicinity regions of the edge pixels; determining whether the pixels are the foreground pixels or the background pixels by comparing the evaluation values with a predetermined second threshold, and extracting pixel coupling components obtained by coupling the pixels adjacent in any of upper, lower, right and left directions among the pixels determined to be the foreground pixels.

A computer program product includes a non-transitory computer-usable medium having computer-readable program codes embodied in the medium. The program codes when executed causing a computer to execute: inputting an input image containing a plurality of pattern elements; calculating edge intensities of pixels from the input image so as to extract edge pixels; obtaining evaluation values for determining whether the pixels are foreground pixels or background pixels based on comparison result between first thresholds set corresponding to the edge pixels and pixel values of pixels contained in vicinity regions of the edge pixels; determining whether the pixels are the foreground pixels or the background pixels by comparing the evaluation values with a predetermined second threshold, and extracting pixel coupling components obtained by coupling the pixels adjacent in any of up-down and right-left directions among the pixels determined to be the foreground pixels.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, described are embodiments of a pattern processing device with reference to the accompanying drawings. The embodiments describe examples in which the pattern processing device is embodied in a projector. A calibration pattern image projected by the projector is captured with a digital camera, the captured image is input to the projector, again, and a calibration pattern for distortion correction is generated. It is to be noted that the projector itself may also have a function of capturing a projected image.

First Embodiment

Figure 1A:
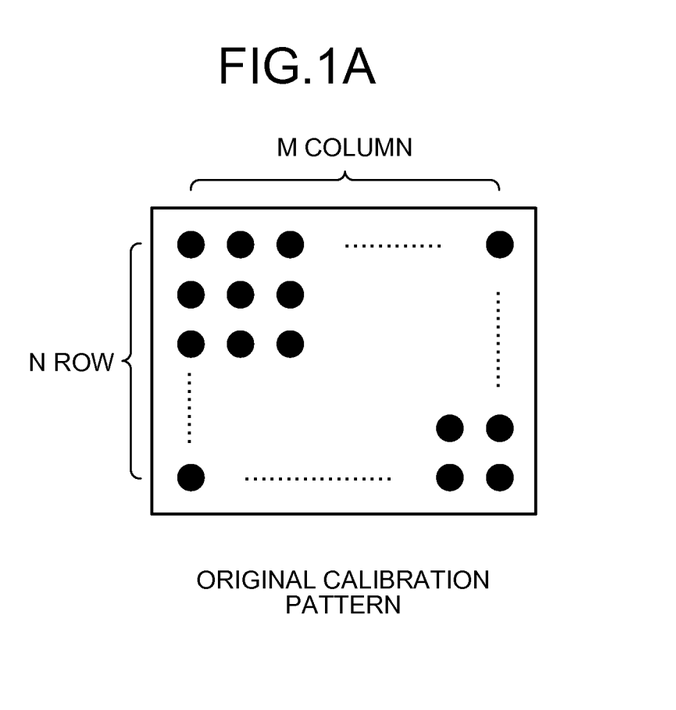
FIG. 1A is a view illustrating an example of data of a calibration pattern image to be projected according to a first embodiment of the present invention.
Figure 1B:
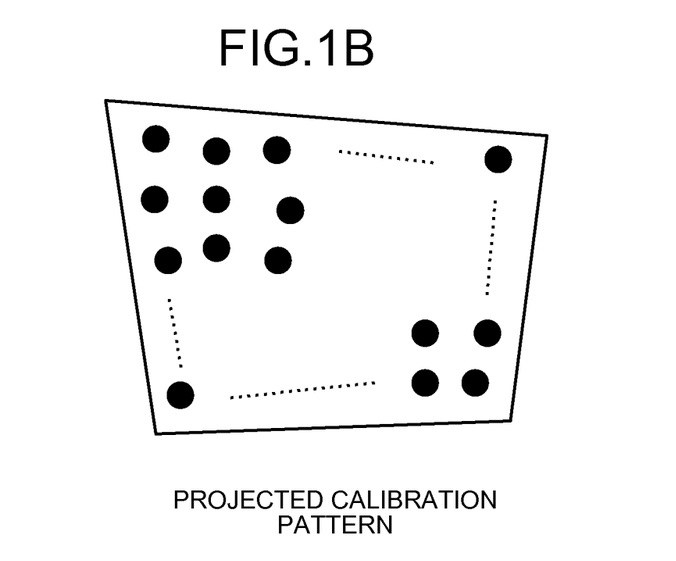
FIG. 1B is a view illustrating an example of the calibration pattern image projected actually according to the first embodiment.

FIG. 1A illustrates an example of data of a calibration pattern image to be projected onto a wall, a screen, or the like. FIG. 1B illustrates an example of the calibration pattern image projected onto a projection surface actually in a state where distortion is generated. The calibration pattern image is an image on which pattern elements indicated by black circles of M×N are arranged in a grid form. If the data of the calibration pattern image is projected, distortion as illustrated in FIG. 1B is generated depending on the state of the projection surface. In order to eliminate the distortion, the calibration pattern image as illustrated in FIG. 1B is captured with the above-mentioned digital camera and is input to the pattern processing device according to the invention. The pattern processing device is configured integrally with the projector in the first embodiment but may be mounted on another piece of hardware.

Figure 2:
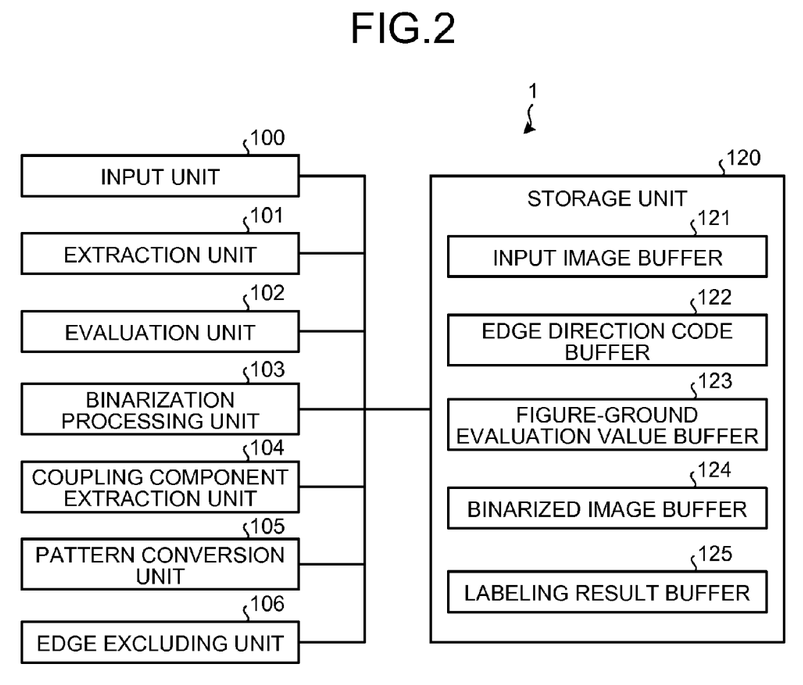
FIG. 2 is a block diagram illustrating a configuration of a pattern processing device according to the first embodiment.

FIG. 2 is a block diagram illustrating an example of a configuration of the pattern processing device according to the first embodiment. As illustrated in FIG. 2, this pattern processing device 1 includes an input unit 100, an extraction unit 101, an evaluation unit 102, a binarization processing unit 103, a coupling component extraction unit 104, a pattern conversion unit 105, an edge excluding unit 106, and a storage unit 120. Functions of the respective parts that will be described below may be made to operate by software or by hardware such as an electronic circuit.

Figure 3:
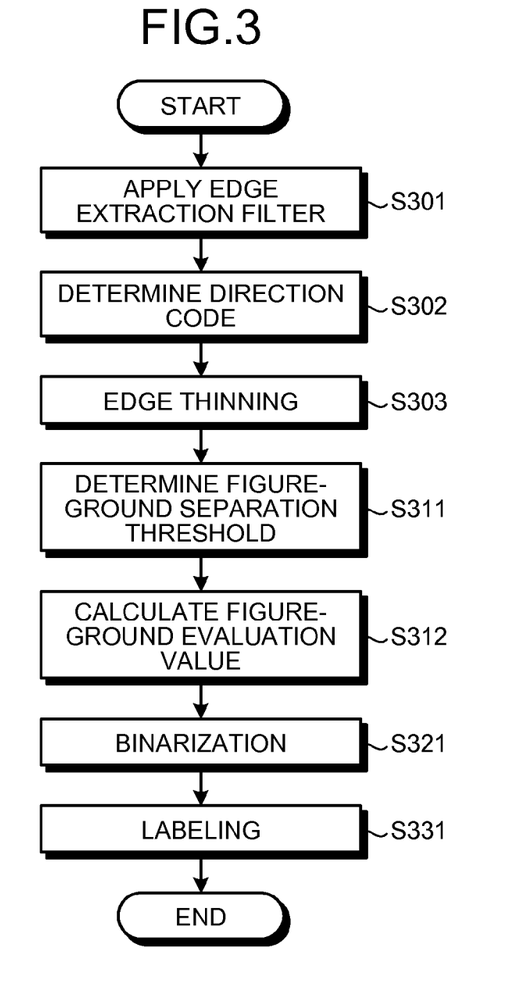
FIG. 3 is a flowchart illustrating flow of pattern processing according to the first embodiment.

A pattern image captured with the digital camera or the like is input to the input unit 100. Thereafter, the input pattern image is stored in an input image buffer 121 of the storage unit 120 as an input image. It is to be noted that the input image stored in the input image buffer 121 may not be captured data as it is and may be an image on which image processing such as size conversion and color correction has been performed. Furthermore, the pattern indicates not only the black circle as described in the embodiment but other patterns can be used. The pattern is not limited thereto. Any figures and images can be used as the pattern as long as it has brightness or color that is definitely different from that of the background thereof. For example, a black circle on a white background, a white circle on a black background, or a black rectangle, a black triangle or a black star shape on the white background (a white rectangle, a white triangle, or a white star shape on the black background) can be also used as the pattern. In the first embodiment, the input image is converted to a gray-scale image having brightness of pixels of the respective pattern elements on the captured image in a range of 0 (black) to 255 (white). Thereafter, the input image is subjected to pattern processing as illustrated in FIG. 3 so as to generate a calibration pattern image for calibrating distortion. The calibration pattern image generated in this manner and an original pattern image with no distortion are compared, so that a correction value for distortion correction processing is calculated.

Figure 4A:
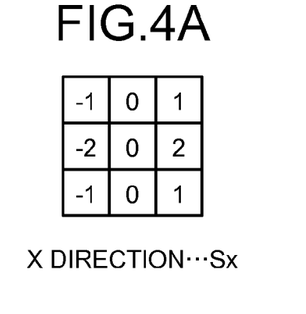
FIGS. 4A and 4B are views illustrating an example of a Sober filter according to the first embodiment.
Figure 4B:
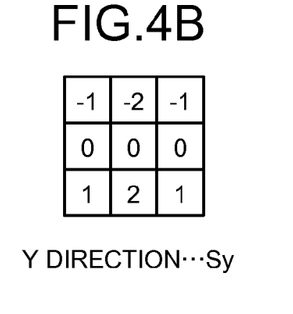

First, the extraction unit 101 acquires the input image from the input image buffer 121 and applies an edge extraction filter for extracting edge pixels and the gradient directions of the edge pixels on the input image (step S301). The extraction unit 101 applies a Sober filter as illustrated in FIG. 4 to respective pixels P(x, y) (0≤X≤M−1, 0≤Y≤N−1) constituting the input image. With this, the extraction unit 101 calculates intensities E(x, y) and gradient directions θ(x, y) of the brightness gradient corresponding to the respective pixels P(x, y) based on the following equation 1.

$E(x,y)=\text{SQRT}\{Sx(x,y)^2+Sy(x,y)^2\}$ $\theta(x,y)=\arctan(Sy(x,y)/Sx(x,y))$ wherein $Sx(x,y)=P(x+1,y-1)-P(x-1,y-1)+2*\{P(x+1,y)-P(x-1,y)\}+P(x+1,y+1)-P(x-1,y+1)$ $Sy(x,y)=P(x-1,y+1)-P(x-1,y-1)+2*\{P(x,y+1)-P(x,y-1)\}+P(x+1,y+1)-P(x+1,y-1)$ (SQRT{ } is a square root)

Figure 5:
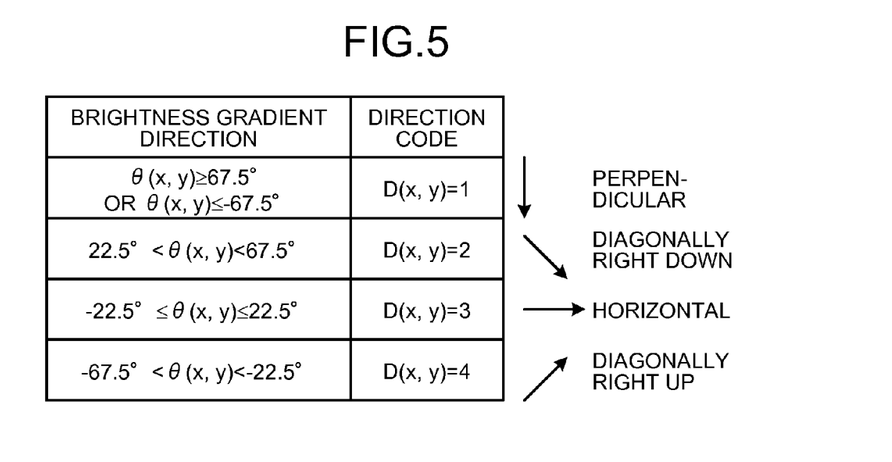
FIG. 5 is a table illustrating a correspondence relation between the brightness gradient direction and a direction code according to the first embodiment.

Subsequently, the extraction unit 101 determines values of direction codes assigned to the respective pixels with reference to FIG. 5 based on the values of the gradient directions θ calculated for the respective pixels (FIG. 3: step S302). As an angle of the brightness gradient direction in FIG. 5, used is a coordinate system in which an upper left corner of the image is set as a point of origin, the lower side in the vertical direction is set to the positive side in the y-axis direction, and the clockwise direction is set as the positive angle in accordance with a common image processing method. As illustrated in FIG. 5, when the value of θ(x, y) is equal to or larger than 67.5 degrees or equal to or smaller than −67.5 degrees, D(x, y)=1 as the direction code is assigned to the corresponding pixel. "1" is the direction code indicating that the gradient direction is perpendicular. Furthermore, the value of θ(x, y) is larger than 22.5 degrees and smaller than 67.5 degrees, D(x, y)=2 as the direction code is assigned to the corresponding pixel. "2" is the direction code indicating that the gradient direction is diagonally right down. When the value of θ(x, y) is equal to or larger than −22.5 degrees or equal to or smaller than 22.5 degrees, D(x, y)=3 as the direction code is assigned to the corresponding pixel. "3" is the direction code indicating that the gradient direction is horizontal. When the value of θ(x, y) is larger than −67.5 degrees and smaller than −22.5 degrees, D(x, y)=4 as the direction code is assigned to the corresponding pixel. "4" is the direction code indicating that the gradient direction is diagonally right up. These direction codes D(x, y) are stored in an edge direction code buffer 122 of the storage unit 120 while being made to correspond to the respective pixels P(x, y). The direction codes are assigned to only the pixels extracted as the edge pixels. "0" as the direction code is assigned to the pixels other than the edge pixels.

Figure 6:
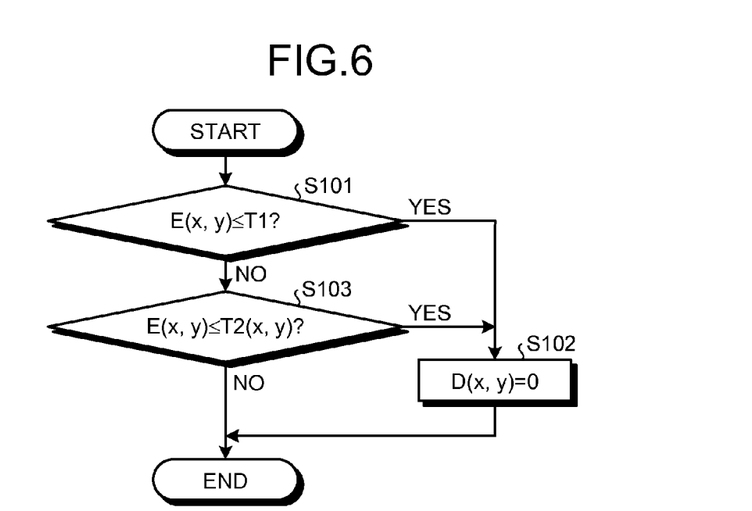
FIG. 6 is a flowchart illustrating flow of processing of edge exclusion according to the first embodiment.

Then, the edge excluding unit 106 performs edge thinning processing for removing noise of the edges (step S303). Described is specific flow of the processing with reference to FIG. 6. As illustrated in FIG. 6, the edge excluding unit 106 selects a pixel at given coordinates (x, y) and determines whether E(x, y) as the intensity of the brightness gradient of the pixel P(x, y) is equal to or smaller than a predetermined threshold T1 (corresponding to a third threshold) (step S101). When E(x, y) has been determined to be equal to or smaller than the predetermined threshold T1 that has been defined previously (Yes at step S101), the edge excluding unit 106 sets D(x, y) as the direction code of P(x, y) to 0 (step S102). In the first embodiment, subsequent pieces of processing are performed while recognizing pixels with direction codes that are not "0" to be the edge pixels. This indicates that the pixels are excluded from the edges if setting the direction codes of the pixels to 0. It is to be noted that when the subsequent pieces of processing are performed based on not the direction code but the intensity E(x, y) of the brightness gradient, processing of setting E(x, y) to 0 may be performed instead.

On the other hand, when E(x, y) has been determined to be larger than the predetermined threshold T1 that has been defined previously (No at step S101), the edge excluding unit 106 determines whether E(x, y) is equal to or smaller than a predetermined threshold T2(x, y) subsequently (step S103). The threshold T2 is a non-maximum suppression threshold for determining whether the intensity E(x, y) of the brightness gradient is maximum among adjacent pixels along the gradient direction and is calculated based on an equation as illustrated in FIG. 7.

Figure 7:
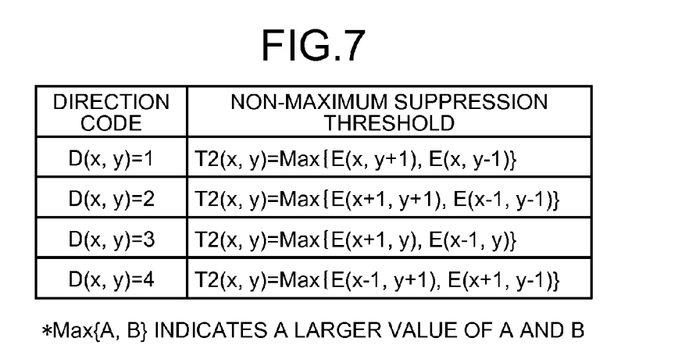
FIG. 7 is a table illustrating a correspondence relation between the direction code and a non-maximum suppression threshold according to the first embodiment.

As illustrated in FIG. 7, when the direction code is D(x, y)=1, the threshold T2 is obtained by Max{E(x, y+1), E(x, y−1)}. Max{A, B} is a function of acquiring a larger value of A and B. In this equation, acquired is a value of an image having a larger intensity of the brightness gradient among the images adjacent in the upper direction and the lower direction. When the direction code is D(x, y)=2, the threshold T2 is obtained by Max{E(x+1, y+1), E(x−1, y−1)}. In this equation, acquired is a value of an image having a larger intensity of the brightness gradient among the images adjacent in the upper left direction and the lower right direction. When the direction code is D(x, y)=3, the threshold T2 is obtained by Max{E(x+1, y), E(x−1, y)}. In this equation, acquired is a value of an image having a larger intensity of the brightness gradient among the images adjacent in the right direction and the left direction. When the direction code is D(x, y)=4, the threshold T2 is obtained by Max{E(x−1, y+1), E(x+1, y−1)}. In this equation, acquired is a value of an image having a larger intensity of the brightness gradient among the images adjacent in the lower left direction and the upper right direction.

Figure 8:
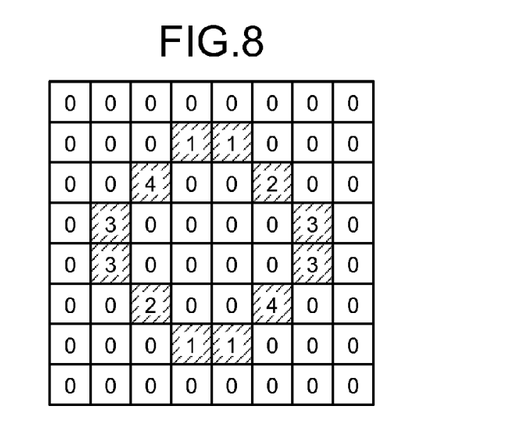
FIG. 8 is a view illustrating direction codes assigned to pixels around a circle as one pattern element after edge thinning processing has been executed according to the first embodiment.

The edge excluding unit 106 performs determination by using the threshold T2 calculated as described above. When E(x, y) is equal to or smaller than the predetermined threshold T2(x, y) (Yes at step S103), the edge excluding unit 106 sets D(x, y) as the direction code of P(x, y) to 0 (step S102). On the other hand, when E(x, y) is larger than the predetermined threshold T2 (x, y) (No at step S103), the edge excluding unit 106 does not perform the processing and finishes the processing. The edges of the pixels are thinned through the above-pieces of processing. FIG. 8 is a view illustrating direction codes assigned to pixels around a circle as one pattern element after the edge thinning processing has been executed.

As illustrated in FIG. 8, direction codes of pixels having smaller intensities of the bright gradient and pixels having intensities that are not maximum values in the edge gradient directions among the respective pixels are 0. Edge line segments having a width 1 to which direction codes other than "0" are assigned are illustrated along the contour of the circular shape.

Figure 9:
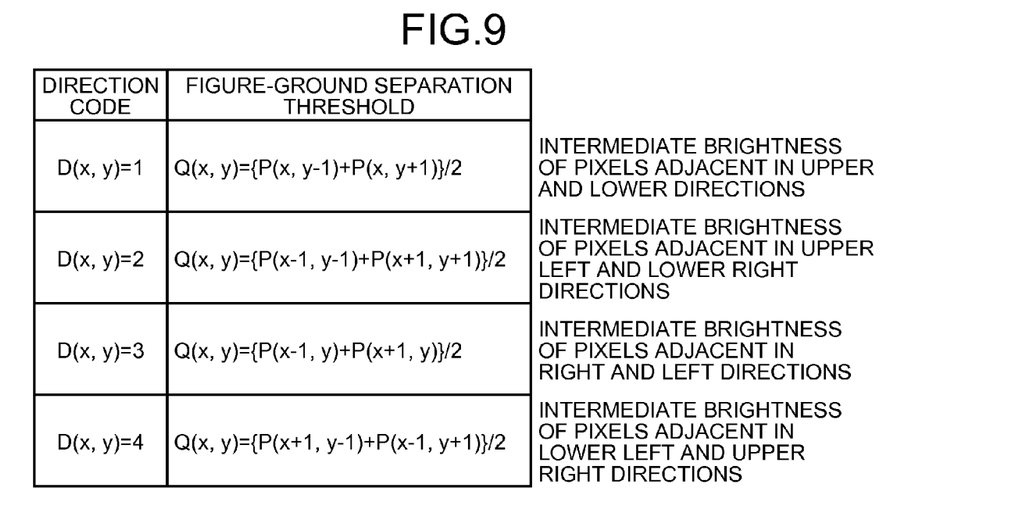
FIG. 9 is a table in which equations for calculating figure-ground separation thresholds for respective direction codes are summarized according to the first embodiment.

Then, the evaluation unit 102 performs figure-ground separation threshold determination processing (FIG. 3: step S311). The figure-ground separation threshold determination processing is processing of determining a threshold Q(x, y) (corresponding to the first threshold) defined for each pixel based on the direction code thereof for the pixels to which the direction codes have been assigned. The figure-ground separation threshold indicates a threshold for determining whether the pixel is a foreground pixel (figure pixel) or a background pixel (ground pixel). In FIG. 8, the pixels with direction codes that are not 0 have maximum intensities of the brightness gradient in the brightness gradient directions. This indicates that the pixel values P(x, y) of two pixels adjacent in the gradient direction are different largely. One pixel corresponds to the foreground pixel and the other pixel corresponds to the background pixel. In the first embodiment, an intermediate value of the pixel values P(x, y) of the two adjacent pixels is set to the figure-ground separation threshold, so that the pixels can be determined to be either of the background pixel or the foreground pixel. FIG. 9 is a table in which equations for calculating the figure-ground separation thresholds for the respective direction codes are summarized.

As illustrated in FIG. 9, in the case of the pixel P(x, y) with direction code D (x, y) of 1, the figure-ground separation threshold Q(x, y) corresponds to intermediate brightness of two pixels adjacent in the upper direction and the lower direction and is obtained by {P(x, y−1)+P(x, y+1)}/2.

In the case of the pixel P(x, y) with direction code D (x, y) of 2, the figure-ground separation threshold Q(x, y) corresponds to intermediate brightness of two pixels adjacent in the upper left direction and the lower right direction and is obtained by {P(x−1, y−1)+P(x+1, y+1)}/2. In the case of the pixel P(x, y) with direction code D (x, y) of 3, the figure-ground separation threshold Q(x, y) corresponds to intermediate brightness of two pixels adjacent in the left direction and the right direction and is obtained by {P(x−1, y)+P(x+1, y)}/2. Furthermore, in the case of the pixel P(x, y) with direction code D (x, y) of 4, the figure-ground separation threshold Q(x, y) corresponds to intermediate brightness of two pixels adjacent in the lower left direction and the upper right direction and is obtained by {P(x+1, y−1)+P(x−1, y+1)}/2.

Figure 10:
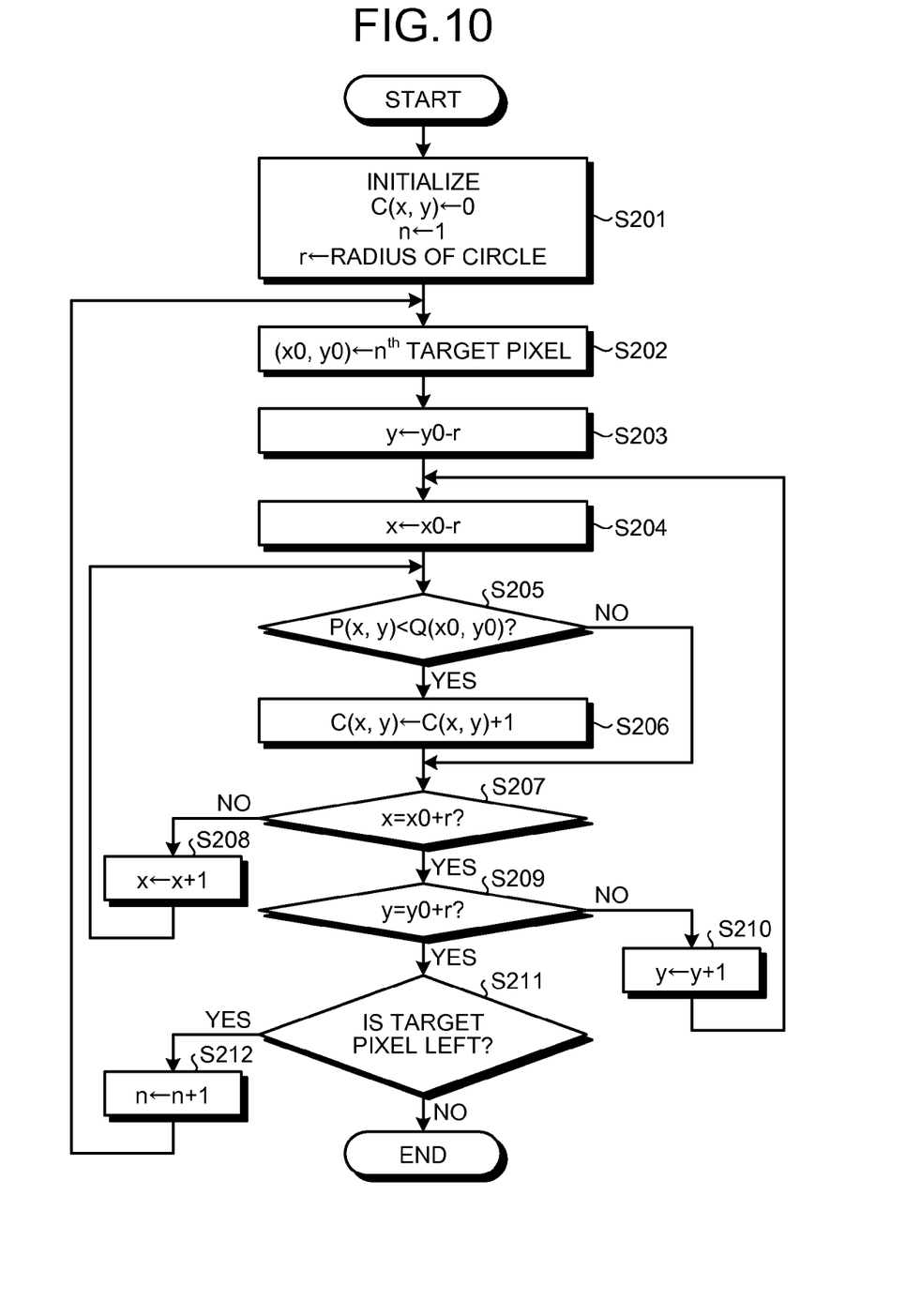
FIG. 10 is a flowchart illustrating flow of processing of calculating a figure-ground evaluation value as a value for determining whether a pixel is a foreground pixel or a background pixel according to the first embodiment.

Subsequently, the evaluation unit 102 performs figure-ground evaluation value calculation processing (FIG. 3: step S312). The figure-ground evaluation value calculation processing is processing of calculating a figure-ground evaluation value C(x, y) for determining whether the pixel P(x, y) is the foreground pixel or the background pixel. Hereinafter, described is flow of the processing of calculating the figure-ground evaluation value C(x, y) for determining whether the pixel P(x, y) is the foreground pixel or the background pixel by using the figure-ground separation threshold Q(x, y) calculated in the above-mentioned manner with reference to FIG. 10. As illustrated in FIG. 10, the evaluation unit 102 initializes the figure-ground evaluation value C(x, y) first (step S201). The evaluation unit 102 initializes a value of n as a pointer for selecting a target pixel (one of the pixels with direction codes that are not 0) to 1 and substitutes a radius of the circle as the pattern element into the value of r. In the first embodiment, when the evaluation unit 102 evaluates the pixel P(x, y), the evaluation unit 102 performs evaluation on not only the pixel P(x, y) but also a range including a vicinity region thereof by using the figure-ground separation threshold Q(x, y).

When only the pixels in the vicinity of the contour of the pattern element in FIG. 8 are evaluated to be either of the foreground pixels or the background pixels, the center portion of the pattern element cannot be evaluated. In order to solve this, it is desirable that the region to which the pattern element size (radius of the circle, here) is reflected is set to the vicinity region. In the first embodiment, a rectangular region defined by a starting point of (x0−r, y0−r) to an ending point of (x0+r, y0+r) by using the radius r of the circle as the pattern element is set to the vicinity region. It is to be noted that the setting of the vicinity region is not limited to the rectangular region with spread equivalent to the radius r of the circle in the up-down and right-left directions about the target pixel. For example, the vicinity region can be set to a rectangular region, one side of which has a length (=SQRT(II)*r) and which has area equivalent to that of the circle, a circular region having a radius equivalent to 1.5×r, or the like.

The evaluation unit 102 sets the target pixel to an $n^{th}$ pixel (step S202). Then, the evaluation unit 102 sets a Y-coordinate of the representative coordinates to a coordinate obtained by subtracting r from y0 that is the coordinate of the target pixel (step S203). Furthermore, the evaluation unit 102 sets an X-coordinate of the representative coordinates to a coordinate obtained by subtracting r from x0 that is the coordinate of the target pixel (step S204). Then, the evaluation unit 102 determines whether the pixel value P(x, y) of the pixel belonging to the vicinity region is smaller than the figure-ground separation threshold Q(x0, y0) (step S205). When it has been determined that the pixel value P(x, y) of the pixel is smaller (darker) than the figure-ground separation threshold Q(x0, y0) (Yes at step S205), the figure-ground evaluation value C(x, y) corresponding to the pixel P(x, y) is counted up by 1 (step S206). When it has been determined that the pixel value P(x, y) of the pixel is larger (lighter) than the figure-ground separation threshold Q(x0, y0) (No at step S205), step S206 is skipped.

Then, it is determined whether the coordinate X is x0 +r as the maximum X-coordinate in the vicinity region (step S207). When it has been determined that the coordinate X is not x0+r as the maximum X-coordinate in the vicinity region (No at step S207), the evaluation unit 102 increases X by 1 (step S208) and measures the figure-ground evaluation value C(x, y) for the subsequent coordinate. On the other hand, when it has been determined that the coordinate X is x0+r as the maximum X-coordinate in the vicinity region (Yes at step S207), it is determined whether the coordinate Y is y0+r as the maximum Y-coordinate in the vicinity region (step S209). When it has been determined that the coordinate y is not y0+r as the maximum Y-coordinate in the vicinity region (No at step S209), the evaluation unit 102 increases Y by 1 (step S210) and measures the figure-ground evaluation value C(x, y) for the subsequent coordinate from step S204. On the other hand, when it has been determined that the coordinate y is y0+r as the maximum Y-coordinate in the vicinity region (Yes at step S209), it is determined whether the target pixel is still left (step S211). When it has been determined that the target pixel is still left (Yes at step S211), the evaluation unit 102 increases n by 1 (step S212) and repeats the pieces of processing from step S202. On the other hand, when it has been determined that the target pixel is not left (No at step S211), the processing is finished.

Figure 11:
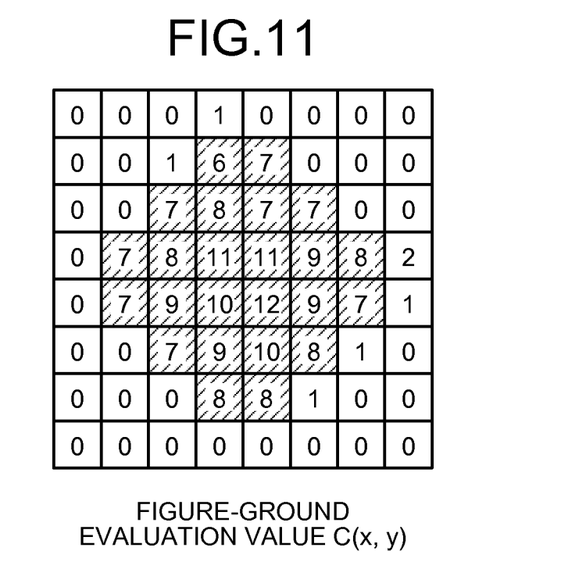
FIG. 11 is a view illustrating a state where the figure-ground evaluation values are assigned to respective pixels constituting the pattern element according to the first embodiment.

FIG. 11 is a view illustrating a state where the figure-ground evaluation values C(x, y) are assigned to the respective pixels constituting the pattern element through the above pieces of processing. As illustrated in FIG. 11, the figure-ground evaluation values C(x, y) assigned to the pixels on the inner region of the circle are higher. Since the respective pixels with direction codes that are not 0 are in the range of the vicinity region, the evaluation values thereof are higher at the inner region side of the circle, as a result. The evaluation unit 102 stores the values of the figure-ground evaluation values C(x, y) assigned to the respective pixels in a figure-ground evaluation value buffer 123.

Then, the binarization processing unit 103 executes binarization processing (FIG. 3: step S321). The binarization processing unit 103 calculates a binarized image B(x, y) in accordance with the following equation by using the figure-ground evaluation values C(x, y) stored in the figure-ground evaluation value buffer 123 and a positive threshold T3 (corresponding to the second threshold) that has been defined previously.

If C (x, y)<T3 is satisfied, B (x, y)=0 is satisfied

If C (x, y)≥T3 is satisfied, B (x, y)=1 is satisfied

Figure 12:
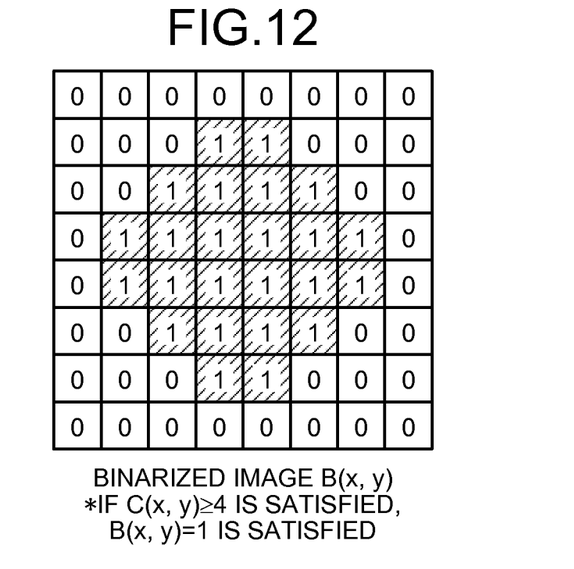
FIG. 12 is a view illustrating a state after the pixels have been subjected to binarization processing according to the first embodiment.

FIG. 12 illustrates the result of the binarization by using the threshold T3=4. Hereinafter, a pixel corresponding to B(x, y)=0 is referred to as a "background pixel" and a pixel corresponding to B(x, y)=1 is referred to as a "foreground pixel". Pixels recognized as the foreground pixels are arranged along the circular shape of the pattern element as illustrated in FIG. 12. The values of the binarized B(x, y) are stored in a binarized image buffer 124 together with the coordinates thereof.

Figure 13:
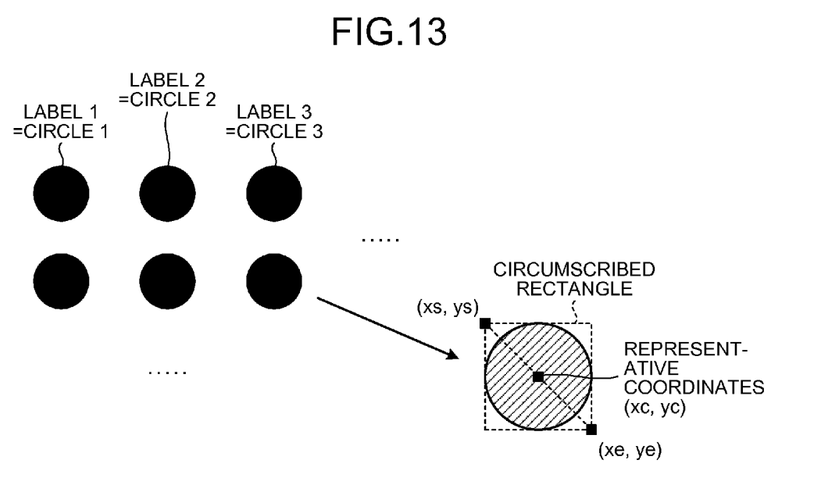
FIG. 13 is a view illustrating pixel coupling components that have been subjected to labeling processing according to the first embodiment.

Subsequently, the coupling component extraction unit 104 performs labeling processing on the binarized image B(x, y) (FIG. 3: step S331). The labeling processing is processing of integrating figure pixels adjacent in the up-down and right-left directions as one group. As the labeling processing on the binarized image, an existing labeling method is used. In the first embodiment, all the pixels indicated by "1" in FIG. 12 are coupled, so that a coupling component corresponds to the shape of one circular pattern element is generated. The labeling makes it possible to obtain the figure pixel coupling components added with unique labels. Since it is considered that the individual figure pixel coupling component corresponds to one circle as illustrated in FIG. 13, an $i^{th}$ figure pixel coupling component is output as an $i^{th}$ pattern element (circle). The labeling result to be output are stored in a labeling result buffer 125. In this case, one middle point between a starting point (xs, ys) and an ending point (xe, ye) of a circumscribed rectangle of the figure pixel coupling component corresponding to the circle is used as representative coordinates (xc, yc) of one circle in the first embodiment. The representative coordinates (xc, yc) are calculated with the following equation.

$$xc=(xs+xe)/2$$

$$yc=(ys+ye)/2$$

Then, the pattern conversion unit 105 converts the generated pixel coupling components as the pattern elements, so that a calibration pattern image constituted by the pattern elements is acquired. In this manner, based on one input image, the circles of the pattern elements constituting the pattern image are extracted as the pixel coupling components and the representative coordinates of the respective circles are acquired. Distortion between the calibration pattern image acquired in this manner and an ideal pattern image is calculated and processing for correcting projection is executed. The existing method can be used for the processing for distortion correction.

In the pattern processing device 1 as described above, binarization processing is performed on the pixels constituting the pattern element based on not the absolute values of brightness but the edge gradient intensities based on a relative difference in the brightness between the background pixels and the foreground pixels of the pattern. This make it difficult to arise a problem that the absolute values of the brightness are changed due to illumination unevenness or the like and a calibration pattern image cannot be acquired appropriately, thereby extracting a characteristic point with high accuracy.

Furthermore, illumination is not required to be turned off or a plurality of image are not required to be projected for acquiring the pattern image. This can also reduce an effort for acquiring the pattern.

Furthermore, pixels with noise and pixels with pixel values that are not maximum among the edge pixels are excluded, so that the characteristic point can be extracted with higher accuracy. Furthermore, when the vicinity region is set, the radius of the circle of the pattern element is used as a value for setting a range of the vicinity region. This makes it possible to cause the pixels constituting the pattern element to be contained in the evaluation range appropriately while setting the edge pixels to base points.

Second Embodiment

Described is a second embodiment of the pattern processing device. In the second embodiment, processing of determining whether a shape characteristic of the figure pixel coupling component obtained by the labeling processing is identical to a characteristic of the pattern element that has been defined previously. To be more specific, it is checked whether the width w and the height h of the circumscribed rectangle of the graphic coupling component satisfy references defined by the following equations by using thresholds T4, T5 and T6 (T4<T5, and T6>1).

$$T4 \leq w \leq T5 \text{ and } T4 \leq h \leq T5 \tag{1}$$

$$1/T6 \leq w/h \leq T6 \tag{2}$$

The thresholds T4 and T5 are values indicating minimum values and maximum values of the width and the height of the circumscribed rectangle of the graphic coupling component. In the second embodiment, since the pattern element is circular, the maximum values of the width and the height are the same. Furthermore, the thresholds T4 and T5 are set based on the size of the pattern element that has been set previously. The threshold T6 is set such that an aspect ratio of the circumscribed rectangle is in the range of T6:1 to 1:T6 and the shape thereof is closer to a square shape. Since these shape characteristics of the figure pixel coupling component are different depending on the shape of the original pattern element, the values of the thresholds are set in accordance with the shape appropriately.

Figure 14A:
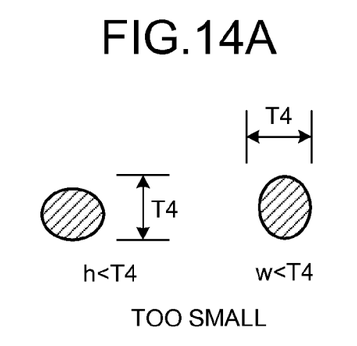
FIG. 14A is a view illustrating an example in which a shape characteristic of the pixel coupling component is not satisfied according to a second embodiment of the present invention.
Figure 14B:
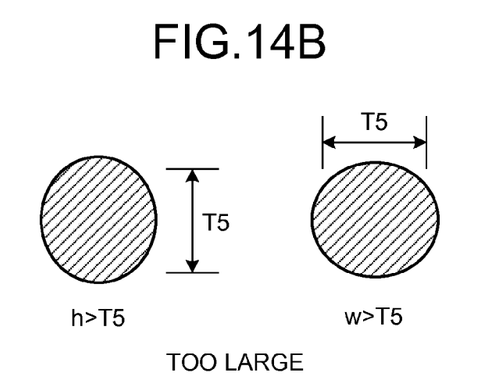
FIG. 14B is a view illustrating another example in which the shape characteristic of the pixel coupling component is not satisfied according to the second embodiment.
Figure 14C:
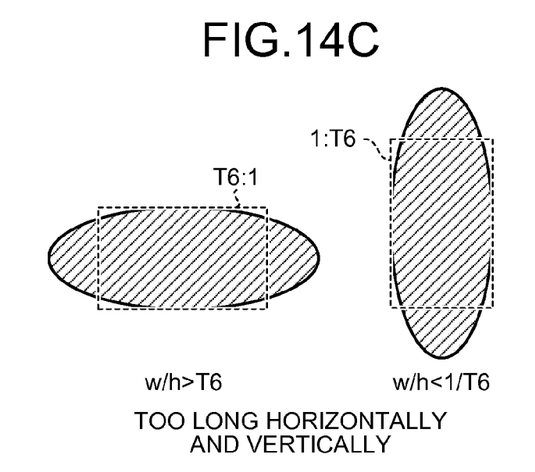
FIG. 14C is a view illustrating still another example in which the shape characteristic of the pixel coupling component is not satisfied according to the second embodiment.

When at least one of the conditions (1) and (2) is not satisfied, the figure pixel coupling component that does not satisfy the shape characteristic is excluded from the calibration pattern image. As a result, the figure pixel coupling components having shapes as illustrated in FIG. 14A to FIG. 14C are removed. The figure pixel coupling components result from a background object such as a screen frame and a projector main body that is shot undesirably or minute noise caught in the image capturing process. Only the figure pixel coupling components corresponding to the circles as pattern elements to be extracted originally can be acquired.

Third Embodiment

In the first embodiment, the middle point between the starting point (xs, ys) and the ending point (xe, ye) of the circumscribed rectangle of the figure pixel coupling component corresponding to the circle is used as the representative coordinates (xc, yc) of the extracted pattern element. Alternatively, in a third embodiment, the center of gravity of the figure pixels constituting the figure pixel coupling component is used as the representative coordinates (xc, yc) of the extracted pattern element.

That is to say, if coordinates of an $i^{th}$ pixel among the N figure pixels constituting the target figure pixel coupling component is assumed to be (xi, yi), xc and yc to be calculated from $$xc = \sum_{i=1}^{N} xi/N$$

$$yc = \sum_{i=1}^{N} yi/N$$

are set to the representative coordinates.

Figure 15:
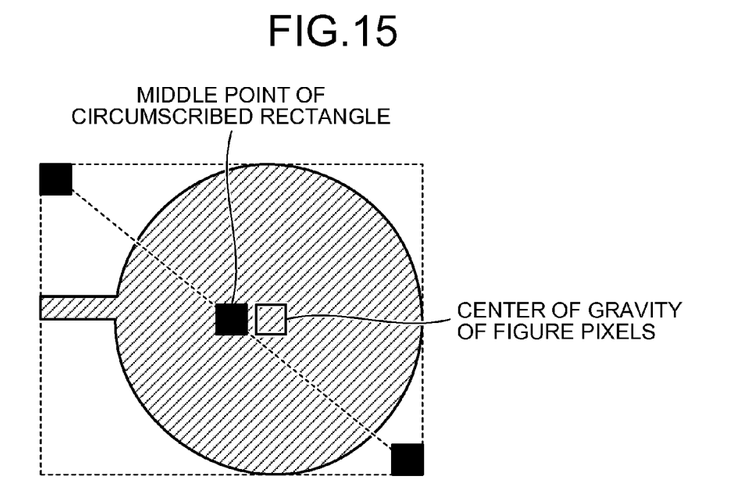
FIG. 15 is a view illustrating the case where the center of gravity of the pixel coupling component is set as representative coordinates according to a third embodiment of the present invention.

If camera shake occurs at the time of image capturing or noise due to contamination of the screen is mixed, and the figure pixel coupling component has an elongated hair-like protrusion as illustrated in FIG. 15, for example, the middle point of the circumscribed rectangle responds to the protrusion sensitively and the position of the middle point is deviated largely in comparison with the ideal case with no protrusion.

On the other hand, as for the center of gravity, the degree of influence by pixels with the hair-like protrusion when the center of gravity is calculated is small if the total number of figure pixels N is sufficiently large. This makes it possible to obtain the position that is substantially the same as the ideal case with no protrusion.

Figure 16:
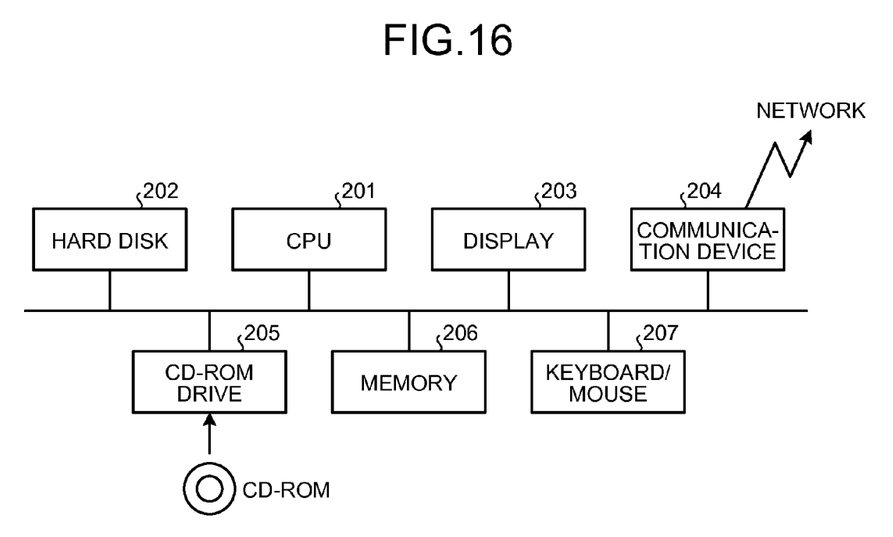
FIG. 16 is a diagram illustrating an example of a hardware configuration of the pattern processing device.

It is to be noted that programs relating to the pattern processing can be made to be executed by programs on a computer. FIG. 16 is a hardware configuration diagram illustrating a configuration of a common computer. The computer includes a central processing unit (CPU) 201, a hard disk 202, a display 203, a communication device 204, a compact disc-read only memory (CD-ROM) drive 205, a memory 206, and a keyboard/mouse 207. For example, a pattern processing program recorded in a recording medium such as a CD-ROM may be made to be read through the CD-ROM drive 205 and be loaded on the memory 206 at the time of the execution. In this case, processing steps of the program may be made to be executed sequentially by a direction from the CPU 201. An input image is stored on the hard disk 202 previously or is loaded on the memory 206 to be referred after having been loaded through a digital camera (not illustrated) at the time of the execution. The result of the pattern extraction is stored in the memory 206, and then, is read out from the memory 206 if necessary. Thereafter, the result of the pattern extraction is written into the hard disk 202, is output to the display 203, is transmitted onto a network through the communication device 204, or is printed onto a sheet through a printer (not illustrated) depending on usage demands.

Furthermore, in the above-mentioned embodiments, when the pixel values of the pixels contained in the vicinity region of the target pixel with edge gradient are larger than the predetermined threshold, the figure-ground evaluation values are increased. Alternatively, a configuration in which when the pixel values of the pixels are smaller than the predetermined threshold, the figure-ground evaluation values is decreased can be also employed. That is to say, the binarization can be performed on the pixels contained in the vicinity region with higher accuracy as long as not the absolute values but the evaluation values that can be determined comprehensively to be calculated can be used.

A pattern processing device according to an aspect of the present invention includes an input unit to input an input image containing a plurality of pattern elements, an extraction unit that extracts edge pixels and gradient directions of edge gradient from the input image, an evaluation unit that varies evaluation values for determining whether the pixels contained are foreground pixels or background pixels, based on comparison result between first thresholds defined for the respective edge pixels and pixel values of pixels in vicinity regions of the edge pixels, a binarization determining unit that determines whether the pixels are the foreground pixels or the background pixels by comparing the evaluation values with a predetermined second threshold, a coupling component extraction unit that generate pixel coupling components obtained by coupling the pixels adjacent in any direction among the pixels determined to be the foreground pixels, and a pattern conversion unit that converts the generated pixel coupling components to the pattern elements for calibration.

The embodiment provides an effect of making it possible to calibrate distortion with a small effort and extract characteristic points with high accuracy even if unevenness occurs at the time of projection.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pattern processing device comprising:
an input unit to input an input image containing a plurality of pattern elements;
an extraction unit that calculates edge intensities of pixels from the input image so as to extract edge pixels and determines, for each extracted edge pixel, gradient direction of brightness gradient of the edge pixel;
an evaluation unit that determines for said each extracted edge pixel, a first threshold value set to the extracted edge pixel, and obtains evaluation values for determining whether the pixels from the input image are foreground pixels or background pixels, based on comparison result between (i) the first threshold value corresponding to the respective edge pixels and (ii) pixel values of pixels contained in vicinity regions of the edge pixels, the first threshold value of the extracted edge pixel being determined based on the gradient directions of the brightness gradient of the edge pixel;
a binarization determining unit that determines whether the pixels are the foreground pixels or the background pixels by comparing the evaluation values with a predetermined second threshold, and
a coupling component extraction unit that extracts pixel coupling components obtained by coupling the pixels adjacent in any direction among the pixels determined to be the foreground pixels.

2. The pattern processing device according to claim 1, wherein the evaluation unit sets ranges calculated by using a predetermined size of the pattern elements and using the edge pixels as base points, as the vicinity regions.

3. The pattern processing device according to claim 1, wherein the evaluation unit calculates intermediate values of the pixel values of the edge pixels and the pixels adjacent to the edge pixels in gradient directions of the edge intensities as the first threshold values.

4. The pattern processing device according to claim 1, wherein the extraction unit calculates edge intensities of the pixels and extracts the edge pixels after having performed principal component analysis of the input image to convert the input image to a gray-scale image.

5. A pattern processing method comprising:
inputting an input image containing a plurality of pattern elements;
calculating edge intensities of pixels from the input image so as to extract edge pixels and determining, for each extracted edge pixel, gradient direction of brightness gradient of the edge pixel;
determining for said each extracted edge pixel, a first threshold value set to the extracted edge pixel, and obtaining evaluation values for determining whether the pixels from the input image are foreground pixels or background pixels based on comparison result between (i) the first threshold values corresponding to the respective edge pixels and (ii) pixel values of pixels contained in vicinity regions of the edge pixels, the first threshold value of the extracted edge pixel being determined based on the gradient directions of the brightness gradient of the edge pixel;
determining whether the pixels are the foreground pixels or the background pixels by comparing the evaluation values with a predetermined second threshold, and extracting pixel coupling components obtained by coupling the pixels adjacent in any of upper, lower, right and left directions among the pixels determined to be the foreground pixels.

6. The pattern processing method according to claim 5, wherein setting ranges calculated by using a predetermined size of the pattern elements and using the edge pixels as base points, as the vicinity region at the obtaining the evaluation values.

7. A computer program product comprising a non-transitory computer-usable medium having computer-readable program codes embodied in the medium, wherein the program codes when executed causing a computer to execute:

inputting an input image containing a plurality of pattern elements;

calculating edge intensities of pixels from the input image so as to extract edge pixels and determining, for each extracted edge pixel, gradient direction of brightness gradient of the edge pixel;

determining for said each extracted edge pixel, a first threshold value set to the extracted edge pixel, and obtaining evaluation values for determining whether the pixels from the input image are foreground pixels or background pixels based on comparison result between (i) the first threshold values corresponding to the respective edge pixels and (ii) pixel values of pixels contained in vicinity regions of the edge pixels, the first threshold value of the extracted edge pixel being determined based on the gradient directions of the brightness gradient of the edge pixel;

determining whether the pixels are the foreground pixels or the background pixels by comparing the evaluation values with a predetermined second threshold, and extracting pixel coupling components obtained by coupling the pixels adjacent in any of upper, lower, right and left directions among the pixels determined to be the foreground pixels.

* * * * *